Patented Feb. 3, 1953

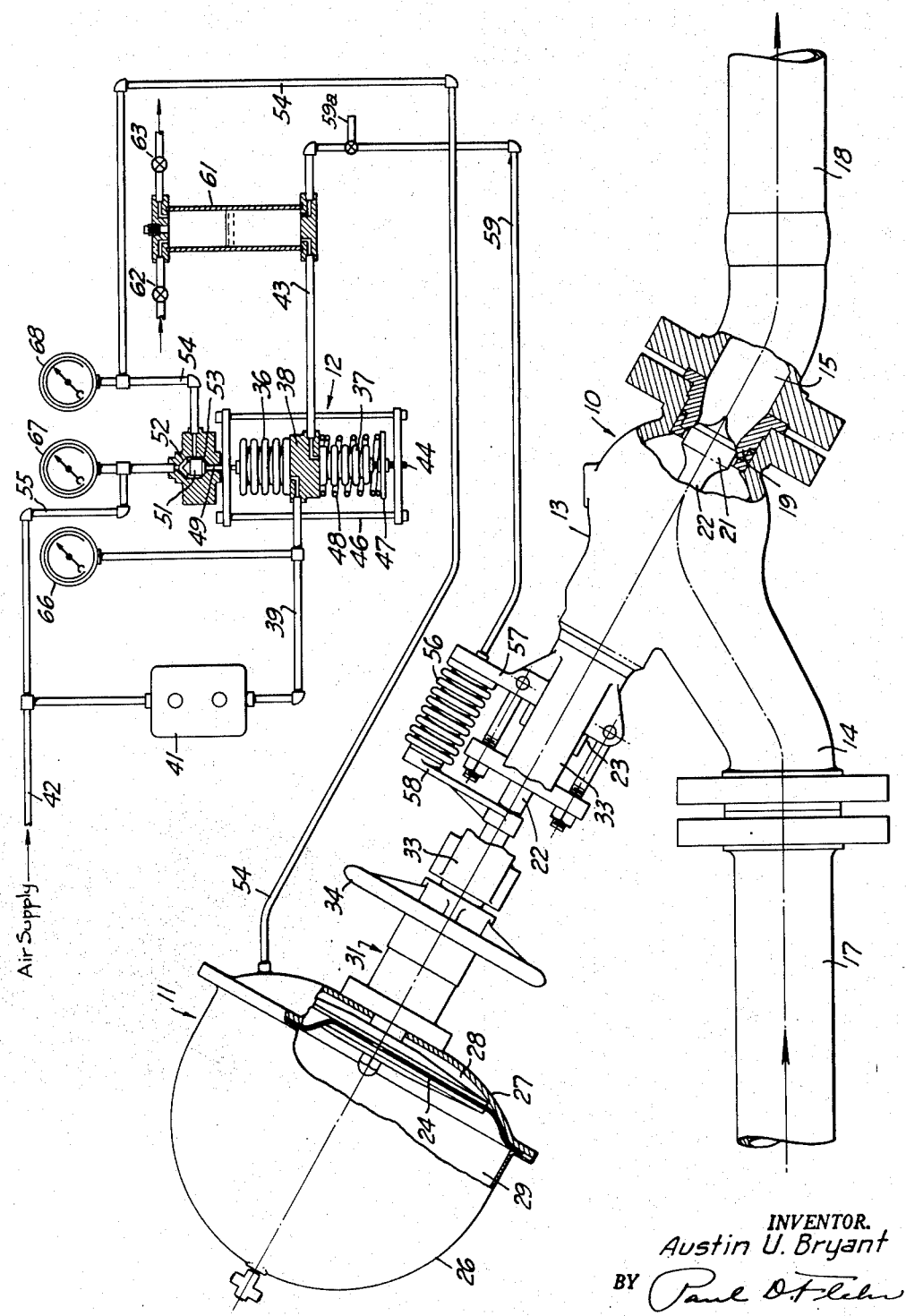

2,627,249

UNITED STATES PATENT OFFICE 2,627,249

FLUID PRESSURE OPERATED POSITIONING APPARATUS FOR MOTOR VALVES

Austin U. Bryant, Berkeley, Calif., assignor, by mesne assignments, to M & J Engineering Co., a partnership Application May 31, 1947, Serial No. 751,542

2 Claims. (Cl. 121—41)

This invention relates generally to apparatus adapted to secure predetermined positioning of a movable member in accordance with the value of a controlling pressure. More particularly it relates to valve apparatus including a so-called pneumatic valve positioner, whereby predetermined incremental positioning of the valve member is secured in response to variations in the controlling pressure.

In the past it has been common practice to control motor operated valves by the use of a so-called valve positioner. The valve positioner is a pneumatic device which is responsive to the controlling pressure, and which in turn controls supply of air pressure to the operating diaphragm of the valve to thereby move the valve to the desired position. A mechanical connection is provided between the valve rod and the valve positioner whereby the action of the valve positioner is modified in such a manner as to secure predetermined incremental positioning of the valve member in response to variations in the controlling pressure.

Generally apparatus of the type described above is not capable of a wide range of adjustment. Some adjustment is had by varying the ratio of the linkage connecting the valve rod with the valve positioner, but this does not enable substantial modification of the response curve plotted between changes in valve position and variations in controlling pressure. Also in order to secure linear flow control characteristics from such valve apparatus it is customary to use characterized plugs, which in many instances are objectionable.

It is an object of the present invention to provide apparatus of the above character having a wide variety of adjustment, and which eliminates conventional types of mechanical connections between the valve rod and the pneumatic valve positioner.

Another object of the invention is to provide a valve apparatus which can be made to have relatively proportional control characteristics for the main valve, without resorting to the use of conventional characterized plugs.

Additional objects and the features of the invention will appear from the following description in which the preferred embodiment has been set forth in detail in conjunction with the accompanying drawing.

The apparatus as diagrammatically illustrated in the drawing consists generally of a valve 10 which is provided with an operator designated generally at 11, and which is used in conjunction with a pneumatic valve positioner 12. The type of valve 10 employed may vary in different installations, but in the instance illustrated consists of a valve body 13 provided with inflow and outflow passages 14 and 15 adapted for connection with associated piping 17, 18. Within the valve body there is a stationary seat 19 adapted to cooperate with the valve plug or member 21. A valve stem or rod 22 extends into the body through the packing gland 23, and has its inner end attached to the valve plug 21.

The exterior end of valve stem 22 is attached to the fluid operating diaphragm 24, which is associated with a mounting comprising the closed dome 26 and the dished body part 27. Thus chambers 28 and 29 are provided upon the opposite sides of the diaphragm. An assembly 31 surrounds the outer end of rod 22 and is carried from the body 13 of the valve by yoke 33 (shown in part). Assembly 31 includes the hand wheel 34, which by virtue of suitable threaded engagement with other parts attached to the yoke, makes possible movement of the valve rod manually.

Normally chamber 29 above the diaphragm contains trapped air or other gas at a predetermined pressure whereby a predetermined loading is maintained upon the diaphragm. Instead of providing a predetermined amount of trapped air, chamber 29 can be in continuous communication with a source of air at a constant pressure, such as the discharge side of a small loading regulator.

The valve positioner 12 includes a pair of Sylphon tubes or metal bellows 36 and 37, which are both mounted upon the positioner 38. Pipe 39 connects with the block 38 and is in communication with the interior of Sylphon 36. This pipe leads from a suitable pneumatic control instrument 41, which also connects with the air supply pipe 42. The pressure supplied through pipe 39 to the Sylphon 36 can be termed the controlling pressure. Pipe 43 also connects with block 38 and communicates with the interior of Sylphon 37. As will be presently explained pipe 43 is a part of the hydraulic connection from the valve stem 22. A screw 44 connects the outer or free end of the Sylphon 37 with a yoke 46, which in turn applies thrust to the free end of the Sylphon 36 as illustrated. Screw 44 also carries a disc or plate 47 which engages one end of compression spring 48, the other end of this spring being seated upon block 38. Adjustment of this disc upon the screw 44 serves to adjust the spring 48.

The free end of Sylphon 36 is operatively attached to the stem 49 of a valve member 51. This valve member forms a part of valve means of the waste and supply type. Valve member 51 is double-ended to cooperate with the two opposed valve seats 52 and 53. The space between the seats is connected by pipe 54 with the chamber 28 below the diaphragm 24. The orifice through valve seat 52 is connected by pipe 55 to the air supply pipe 42. The orifice through valve seat 53 is directly vented to the atmosphere past stem 49.

Mounted alongside the valve stem 22 there is a hydraulic actuator in the form of a Sylphon or metal bellows 56. One end of this bellows is attached to a bracket 57 which in turn is carried by the valve body 13. The end of the bellows is attached to the free end of an arm 58 which is rigidly attached to the stem 22. Thus as the stem moves to move the valve member between limiting full open and closed positions, the bellows 56 is expanded or contracted.

Bellows 56 is filled with a suitable non-compressible liquid such as oil, glycerin or glycol and is connected by pipe 59 to the base of a small closed container 61. Both pipes 43 and 59 communicate with the lower interior part of this container as illustrated. Pipes 43, 59 and the Sylphon 37 are likewise filled with liquid, and a certain amount of liquid is normally provided in the container 61. The upper end of container 61 is provided with valve controlled connections 62 and 63, whereby when desired air or gas can be supplied to the container or may be removed. Oil can be added or removed from the system by way of the valve controlled pipe 59a. Pressure gauges 66, 67 and 68 are shown connected respectively to pipes 39, 55 and 54.

Operation of the apparatus described above is as follows: The apparatus is normally adjusted to provide for a desired range of movement for the valve 21, as for example between full open and full closed positions, for a given available range of controlling pressures between certain maximum and minimum values. Assuming that the controlling pressure provided from the instrument 41 through pipe 39 remains substantially constant, valve 51 will be caused to assume a substantially balanced position in which the air supplied through pipe 55 to the pipe 54 and the chamber 28 below the diaphragm 24 is sufficient in pressure to maintain the valve member 21 in a desired position, against the urge of the loading occasioned by air under pressure in chamber 29. This balanced condition is maintained in conjunction with a predetermined pressure of liquid in Sylphon 37 determined by the condition of Sylphon 56. It will be noted in this connection that any change in the hydraulic pressure applied to Sylphon 37 causes a modification in the force applied from the free end of the Sylphon through yoke 46 to the free end of Sylphon 36. Assuming now that there is a predetermined drop in the value of the controlling pressure applied through pipe 39, Sylphon 36 tends to contract to move valve member 51 in a direction to admit more air pressure from pipe 55 to the pipe 54. Thus the pneumatic pressure transmitted through 54 to the under side of diaphragm 24 is increased, and as a result motion is imparted to the valve rod 22 to reposition this rod to a position corresponding to the new controlling pressure. The positioning in this instance will be in a direction to open the valve plug 21. Such movement of the valve rod 22 causes expansion of the Sylphon 56, and as a result expansion of the trapped air in container 61 occurs, with the net result that the hydraulic pressure transmitted to the interior of Sylphon 37 is correspondingly reduced. Reduction of hydraulic pressure in Sylphon 37 tends to reduce the force transmitted from the Sylphon through yoke 46 to Sylphon 36 in a direction to compress the latter. As a result of the modifying (or reactance) forces thereby applied to the free end of Sylphon 36 and to valve member 51, the latter resumes a condition of balance. Conversely a rise in controlling pressure applied through pipe 39 tends to initially expand Sylphon 36 with the result that supply of air to pipe 55 is reduced, venting past valve stem 49 increased, and the air pressure transmitted through pipe 54 reduced. Thus the pressure applied to diaphragm 24 is reduced whereby the valve stem is moved under the urge of the loading force to take up a new position, corresponding to the new controlling pressure. Here again the hydraulic means which serves to interconnect stem 22 with the valve positioner, applies a modified force enabling predetermined incremental movement depending on the predetermined change in controlling pressure.

The air space in container 61 plays a part and is a factor in the manner in which modifying forces are transmitted to the valve positioner, responsive to movements of the valve stem. The pressure variation in chamber 61 is not linear with the movement of the valve stem and bellows 56. As the valve closes causing the oil level to rise in 61 a given movement will make a higher percentage change in a higher pressure. The movement for a given pressure change is proportional to the square of the air space remaining in 61 (for a given air charge).

Varying the amount of oil in the system will change the ratio of air volumes between any two valve positions, such as the ratio of volume with valve completely open to that with it closed and hence will change the characteristics of the positioner, provided the required change in instrument pressure can still be made to give the required travel.

For a given valve travel the ratio of maximum to minimum absolute pressure in 61 and 37 will be the same as the ratio of maximum to minimum air volume in 61 as the pressure times the volume is a constant. This pressure is balanced by the instrument pressure acting in bellows 36. However the ratio of maximum to minimum absolute pressure in chamber 61 is not necessarily the same as the ratio of maximum to minimum instrument absolute pressure. There is a constant force acting which does not vary with the valve travel. This consists of two factors: (1) The atmospheric pressure acting over the difference in areas of the two bellows 36 and 37, and (2) the force of spring 48. Thus balance for the desired ratio of maximum to minimum absolute pressure in chamber 61 may be obtained for any given instrument pressure range by adjustment of spring 48.

The positioner characteristic depends on the ratio of maximum to minimum air volume in chamber 61 and on the adjustment of spring 48. Varying the quantity of oil in the system will give the same ratio for a different valve travel, and hence if the adjustment of spring 48 is unchanged, varying the quantity of oil will give the same characteristic for a different valve travel.

An additional function of the chamber 61, and the trapped gas contained within the same, is as follows: Because the hydraulic system connected to the bellows 56 is a closed one, and because valve member 51 has a very small travel, bellows 56 would be locked against movements if this system were entirely filled with liquid. The trapped air contained in the chamber 61 prevents the system from becoming locked, and therefore small movements of the valve member 51 can occur in response to relatively large movements of valve rod 22.

In practice the positioner is adjusted as follows:

(1) The force of spring 48 is adjusted by means of adjusting disc 47 to give pressure balance for the required characteristic.

(2) The oil level in chamber 61 with the valve closed (or at other known position) is adjusted to give the required characteristic for the required travel of the valve.

(3) Air pressure is induced through 62 or bled through 63 to balance the valve at the proper position for the applied instrument pressure.

The positioner is now in adjustment.

The ratio of maximum to minimum oil pressure for balance is affected by either a change in the ratio of areas of the two bellows 36 and 37, or by the force of spring 48. By changing both the bellows ratio and the spring force a given characteristic may be maintained and the maximum and minimum oil pressures will have the same ratio but the actual pressures will be changed. By the proper selection of the bellows ratio it is possible to have a pressure within chamber 61 which is atmospheric or subatmospheric for certain positions of the valve, thus minimizing the possibility of leakage of trapped air or oil from the system, and also providing a means of charging the system without requiring the use of compressed air.

I claim:

1. In apparatus including a member movable over a substantial distance between limiting positions and adapted to be positioned in accordance with the value of a controlling pressure, motive means adapted to receive pneumatic pressure and serving to apply force to said member to move the same, valve means of the supply and waste type including a valve member movable over a relatively short distance between limiting positions, said valve means having a connection to a source of air pressure and connected to supply air to said motive means in accordance with the positioning of said valve member, a pair of opposed fluid pressure operated devices connected to operate the said valve member, one of said devices being connected to a source of controlling pressure, a fluid displacement operator having a mechanical connection to said first named movable member, a closed chamber, a predetermined quantity of trapped gas within said chamber, and a closed fluid pressure connection containing a predetermined quantity of trapped liquid and forming a pressure transmitting connection capable of applying fluid pressure from said operator to said device and to said chamber, thereby serving to move said device responsive to gas pressure changes effected within said chamber by volume changes within said operator, said trapped gas forming an elastic medium for causing changes in the pressure applied to the liquid responsive to changes in the volume of liquid in said chamber, communication between said closed fluid pressure connection and said chamber serving to vary the volume of liquid in said chamber in response to volume changes within said operator.

2. Apparatus as in claim 1 in which said chamber is substantially cylindrical in form, with its lower portion in fluid communication with said closed fluid pressure connection and with its upper portion sealed and containing the trapped gas.

AUSTIN U. BRYANT.

REFERENCES CITED

The following references are of record in the file of this patent:

UNITED STATES PATENTS

| Number | Name | Date |
| --- | --- | --- |
| 357,345 | Smith | Feb. 8, 1887 |
| 1,992,048 | Temple | Feb. 19, 1935 |
| 2,099,368 | Levy | Nov. 16, 1937 |
| 2,303,752 | Meredith | Dec. 1, 1942 |
| 2,320,508 | Burns | June 1, 1943 |
| 2,333,184 | Kalin | Nov. 2, 1943 |
| 2,372,345 | Temple | Mar. 27, 1945 |
| 2,382,941 | Moore | Aug. 14, 1945 |